(12) United States Patent
Niederste-Hollenberg

(10) Patent No.: US 9,386,157 B2
(45) Date of Patent: Jul. 5, 2016

(54) METHOD AND SYSTEM FOR TELECOMMUNICATION

(71) Applicant: Unify GmbH & Co. KG, Munich (DE)

(72) Inventor: Torsten Niederste-Hollenberg, Aachen (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 14/489,848

(22) Filed: Sep. 18, 2014

(65) Prior Publication Data
US 2016/0088159 A1 Mar. 24, 2016

(51) Int. Cl.
*H04M 1/64* (2006.01)
*H04M 3/533* (2006.01)

(52) U.S. Cl.
CPC .................................. *H04M 3/53333* (2013.01)

(58) Field of Classification Search
CPC .................................................. H04M 3/53333
See application file for complete search history.

(56) References Cited

U.S. PATENT DOCUMENTS

2011/0086627 A1* 4/2011 Khosravi .......... H04M 1/72522 455/418
2013/0225244 A1* 8/2013 Khosravi .......... H04M 1/72522 455/566

* cited by examiner

*Primary Examiner* — Joseph T Phan
(74) *Attorney, Agent, or Firm* — Buchanan Ingersoll & Rooney PC (57) ABSTRACT

Disclosed is a method for telecommunication using a system in which individual journal entries and/or voice mail messages for each user are stored. Each time a user initiates or receives a call the system verifies whether specific journal entries and/or voice mail messages are stored for the respective user and the system presents in case of said specific entries or messages an output to the user to inform the user that said specific entries or messages have been verified or found.

29 Claims, 5 Drawing Sheets

METHOD AND SYSTEM FOR TELECOMMUNICATION

FIELD OF INVENTION

The invention relates to a method for telecommunication, comprising initiating or receiving calls for at least one user of a system, and storing individual journal entries and/or voice mail messages for each user.

BACKGROUND OF THE INVENTION

Modern communication systems maintain at least one journal for each user. The journal entries are categorized to be e.g. incoming, outgoing or missed calls. Furthermore, a user of a modern communication system is usually assigned to a voice mail system storing voice mail messages intended for the user. In these systems the users may be notified of a communication when it arrives but the user receives no notice after the communication is stored.

SUMMARY OF THE INVENTION

It is the object of the invention to inform the user on journal entries and/or voice mail messages correlated to the current telecommunication connection.

The inventive method for telecommunication comprises initiating or receiving calls for at least one user of a system, storing individual journal entries and/or voice mail messages for each user. The method further comprises that each time a user initiates or receives a call the system verifies whether specific journal entries and/or voice mail messages are stored for the respective user and that the system presents in case of said specific entries or messages an output to the user to inform the user that said specific entries or messages have been verified. Each time a user initiates or receives a call the system verifies whether specific journal entries and/or voice mail messages are stored for the respective user. Then the system presents an output to the user to inform the user when the system has verified or found specific entries or messages that correlate to the current telecommunication connection. The user can then check the specific journal entries and voice mail messages that have been found.

The invention provides an advanced information service for the user of a telecommunication system. Whenever a calling party initiates a connection to a called party it is checked whether there are entries present in the journal and/or the voice mail system with regard to the called party. If so, the system will announce this to the calling party prior to setting up the connection or when the telecommunication connection is set up. In order to be prepared for the call the calling party will be able to check these entries. Furthermore, the calling party is able to prevent establishing of the call or to cancel the call setup, respectively. This applies to incoming calls as well.

Journal entries may be limited by their type. For example, only journal entries for incoming calls or of missed calls may be presented/displayed to the user. Combinations of theses types are possible. Journal entries may be limited by their calling number, i. e. the calling number they are related to. For example only journal entries related to internal calling numbers, e.g. internal to a firm or a house, may be displayed to the user. Only the last journal entry of a given calling number may be displayed. Only those journal entries may be shown to the user which have been generated within the last predetermined number of minutes and/or hours and/or days and/or months. Only journal entries not yet read may be displayed. Before setting a up a call, the user may choose to text-to-speech convert a content of a journal entry for being read to the user. This step may be particularly useful for a desktop phone or a mobile device comprising no or a relatively small display. In case of a smartphone the content of a journal entry may be displayed in a message window. Combinations of these embodiments of the invention are possible.

A voicemail presented to the user may be limited by means of the calling number it is related to. For example only voicemails related to internal calling numbers, e.g. internal to a firm or a house, may be presented to the user. Only the last voicemail may be presented. If there are further voicemails for the same calling number, the user may be presented a message that further voicemails are available and it may be offered to the user that these voicemails are presented to the user. Only those voicemails may be presented to the user which have been generated within the last predetermined number of minutes and/or hours and/or days and/or months. If there are further voicemails for the same calling number, the user may be presented a message that further voicemails are available and it may be offered to the user that these voicemails are presented to the user. Only voicemails not yet presented may be displayed. Combinations of these embodiments of the invention with regard to a journal entry and/or a voicemail are possible.

Incoming and outgoing calls of a user may be correlated with existing journal entries/voicemails of the user. The correlation may be by topic, a predetermined interval in time, a locational region such as one or several sites of a firm or pool of friends/colleagues etc. and may be presented together after correlation to the user. The entries of journal entries and/or voicemails may be presented to the user in form of a list in sequential order in time. It is not necessary to manually watch/listen to journal entries/voicemails after short periods of time. The user is automatically hinted at incoming journal entries/voicemails and is able to user specifically select a journal entry/voice for his presentation. Thereafter, the user is able to adjust his communication behavior based on the presented at least one journal entry/voicemail. For example, the user may abort a call set up or being set up or the user may address a missing journal entry/voicemail when communicating with a communication participant the journal entry/voicemail originates from.

A call may be a phone call or some other form of communication such as an SMS (Short Message Service), MMS (Multimedia Messaging System), email, chat or the like. Setting up a call by using an SMS, MMS, Email and/or chat may be defined as establishing up a connection/link over a network such as a LAN (Local Area Network), WLAN (Wireless Local Area Network), WAN (Wide Area Network) and/or the Internet for data transfer. As long as the data to be transferred has not completely been transferred to the recipient the setting up of the call may not be completed. Setting up a call by using a phone call may be defined as establishing a payload connection/link to the callee via signaling data transfer between the calling device/terminal of the caller and the calling device/terminal the callee. The setting up of a call may be executed by a terminal or server or a combination thereof.

In a preferred embodiment of the invention the output of the system is presented before a telecommunication connection for the call is set up to enable the user to prevent establishing of the call or when the telecommunication connection is set up to enable the user to cancel the call set up. This embodiment allows an optimized preparation of a call such that present journal entries and voice mail messages, respectively, are taken into account by the user and unnecessary calls are not initiated or received due to presence of actual information to the user. In a highly preferred embodiment of the invention the output comprises a list of said specific entries or messages and/or a content of each of said specific entries or messages. This embodiment makes possible an information of the user in a very simple and efficient way and allows the user to react to specific entries or messages immediately and individually.

A more efficient level of user information is achieved by a preferred embodiment of the invention wherein the journal entries comprise information on incoming, outgoing, accepted, refused and/or missed calls.

The user information is increased by another preferred embodiment of the invention wherein the system when verifying takes into account only journal entries and/or voice mail messages being new to the user. By this way, any redundant information on already presented entries is avoided.

There are several options to filter the entries available from the journal and/or the voice mail system and how to present them to the user. This applies to incoming calls as well. The called party may be notified about journal entries with regard to the calling party or voice mail messages left by the calling party.

A user-friendly information service is provided by an embodiment of the invention wherein the system when verifying takes into account only journal entries and/or voice mail messages received within a predefined period. This embodiment has the advantage of handling journal entries and voice mail messages, respectively, of said predefined period, e.g. of today, of the last two days, etc., with a higher priority. Preferably, the predefined period can be set by each user individually.

In a preferred embodiment of the invention the system when verifying takes into account only journal entries and/or voice mail messages related to the user calling or to be called. This embodiment allows the user either to cancel or to refuse the call or to respond or to relate to said journal entries and voice mail messages, respectively, during the call when established.

Furthermore, the system when verifying can take into account only journal entries and/or voice mail messages related to a predefined group of users and/or communication partners. This has the advantage of defining groups of telecommunication partners, e.g. internal and external, business and private, etc., and handling each group in a predefined manner set individually by the user. For example, during business hours only predefined private partners are taken into account and out of business hours only predefined business partners are taken into account.

In a highly preferred embodiment of the invention the output generated by the system in case of relevant specific journal entries and voice mail messages, respectively, comprises an acoustic and/or visual signal, preferably an announcement to the user. This guarantees attention of the user to relevant specific journal entries and voice mail messages, respectively.

A very easy information of the user is achieved by an embodiment of the invention wherein said specific voice mail messages are speech-to-text converted and presented to the respective user on a display, preferably on a graphical user interface. In this embodiment the output preferably is presented within an additional window for presentation on the display. The system according to the invention advantageously comprises a display, preferably a graphical user interface, for presenting the output to the user.

Furthermore, the output generated by the system in case of relevant specific journal entries and voice mail messages, respectively, comprises the question whether the user further intends to initiate or to receive the call or to interrupt. This embodiment of the invention requires immediate feedback of the user on the presented relevant specific journal entries and voice mail messages, respectively. In case the output is presented on a graphical user interface the user can respond via an input on the graphical user interface.

The inventive method and the described embodiments thereof may be performed by a computer program product.

A system for telecommunication according to the invention comprises means for initiating and receiving calls for at least one user of the system, a storage unit for storing individual journal entries and/or voice mail messages for each user, a control unit for verification of specific journal entries and/or voice mail messages stored in the storage unit, wherein the control unit is able to verify each time a user initiates or receives a call whether specific journal entries and/or voice mail messages are stored for the respective user and to present in case of specific entries or messages an output to the user to inform the user that said specific entries or messages have been verified. The system according to the invention typically comprises phones, in particular smartphones or tablets, for the users. The inventive system for telecommunication solves the object of the invention for the same reasons as outlined above with respect to the inventive method. The described embodiments of the inventive method may be carried out in form of respective embodiments of the inventive system.

Further features and advantages of the invention are disclosed by the enclosed drawings and the corresponding description. The features mentioned can be used in accordance with the invention either individually or collectively in any combination. The embodiments mentioned are not to be understood as exhaustive enumeration but rather have exemplary character for the description of the invention.

DESCRIPTION OF THE PREFERRED EMBODIMENTS

Figure 1:
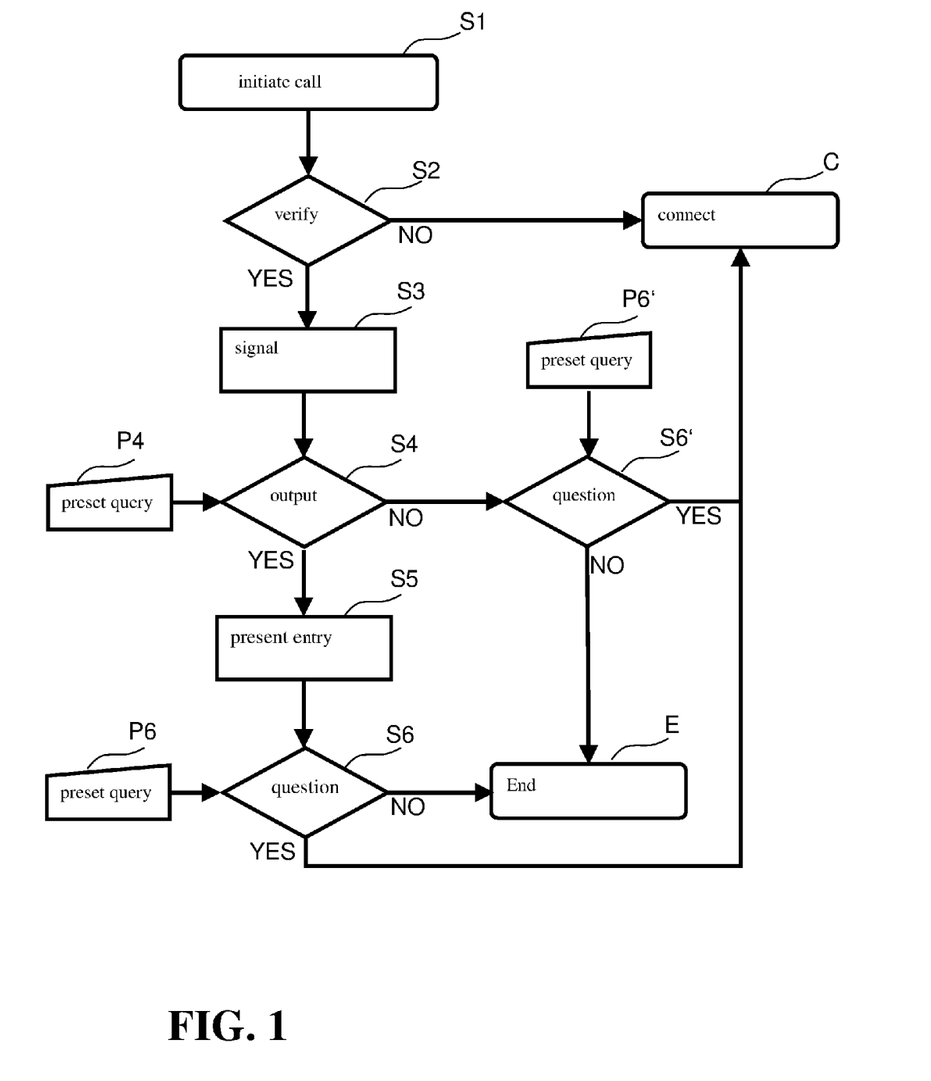
FIG. 1 is a block diagram of a method for telecommunication according to the invention in case of an outgoing call.
Figure 2:
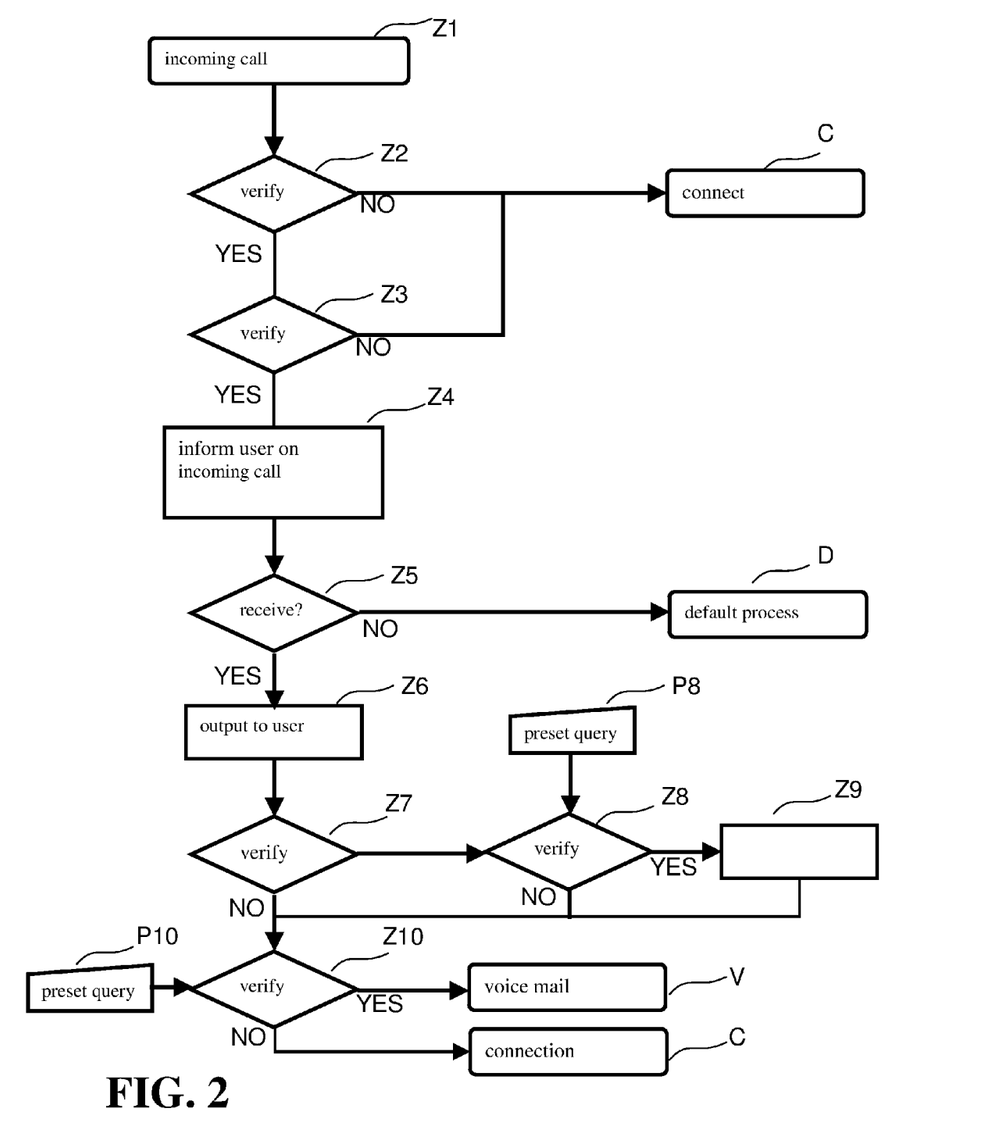
FIG. 2 is a block diagram of a method for telecommunication according to the invention in case of an incoming call.

FIG. 1 and FIG. 2 each illustrate a method for telecommunication, comprising initiating or receiving calls for at least one user of a system, and storing individual journal entries and/or voice mail messages for each user. The journal entries typically comprise information on incoming, outgoing, accepted, refused and/or missed calls.

In a first step S1 of FIG. 1 the user initiates a call, e.g. by dealing a number on a terminal, like a cellphone. In a second step S2 the system verifies whether specific journal entries and/or voice mail messages are stored for the respective user. In the illustrated embodiment the system when verifying takes into account only journal entries and/or voice mail messages related to the user to be called.

Furthermore, the system when verifying can take into account only journal entries and/or voice mail messages related to a predefined group of users and/or communication partners. Preferably, the system when verifying takes into account only journal entries and/or voice mail messages being new to the user. As an alternative, the system when verifying takes into account only journal entries and/or voice mail messages received within a predefined period.

In case of NO, i.e. no specific journal entry or voice mail message, the telecommunication connection is set up in connection step C. In case of YES, i.e. at least one specific journal entry or voice mail message, the system presents an output to the user in a third step S3 to inform the user that said specific entries or messages have been verified or found. The output generated by the system in step S3 comprises an acoustic and/or visual signal, preferably an announcement to the user.

In a fourth step S4 the output generated by the system comprises the question whether the at least one journal entry or voice mail message should be presented to the user. In case of YES the at least one journal entry or voice mail message is presented to the user in a fifth step S5 wherein said specific voice mail messages are either presented acoustically to the user or speech-to-text converted and presented to the respective user on a display of the used terminal, preferably on a graphical user interface of the cellphone. Further, the output can comprise a list of said specific entries or messages and/or a content of each of said specific entries or messages.

In case of NO in step S4 and after step S5 succeeds a sixth step S6, S6' depending on whether at least one journal entry or voice mail message is presented to the user (S6) or not (S6') wherein the output generated by the system comprises the question whether the user further intends to initiate the call or to interrupt. In case of YES the telecommunication connection is set up according to connection step C. In case of NO the initiation of the call is interrupted and comes to an end E without any telecommunication connection.

FIG. 2 differs from FIG. 1 in that receiving of an incoming call and checking of journal entries and/or voice mail messages related to a calling party are illustrated. In a first step Z1 an incoming call arrives at a communication server of the system. In succeeding steps Z2 and Z3 the system verifies whether the number of the calling party is communicated and whether specific journal entries and/or voice mail messages from the respective user are stored. In case of NO in step Z2 or Z3 the telecommunication connection is set up in connection step C.

In case of YES, i.e. at least one specific journal entry or voice mail message, the system presents an output to the user in a fourth step Z4 to inform the user on the incoming call and said at least one specific entry or message. The terminal of the user is connected to a communication server of the system. There is not yet established a telecommunication connection from the calling terminal to the called terminal of the user. The output generated by the system in step Z4 comprises an acoustic and/or visual signal, preferably an announcement to the user.

In case the user does not receive the call in succeeding step Z5 the call is processed according to the default for missed calls in default step D. In case of YES in step Z5 the system presents an output to the user in a sixth step Z6 to inform the user that said specific entries or messages have been verified or found. The output generated by the system in step Z6 comprises an acoustic and/or visual signal, preferably an announcement to the user.

In step Z7 the system verifies whether a text terminal is used. In case of YES the output generated by the system in step Z8 comprises the question whether the at least one journal entry or voice mail message should be presented to the user. In case of YES the at least one journal entry or voice mail message is presented to the user in step Z9 wherein said specific voice mail messages are speech-to-text converted and presented to the respective user on a display of the used text terminal, preferably on a graphical user interface of the cellphone.

In case of NO in step Z7 or Z8 and after step Z9 succeeds a tenth step Z10 wherein the output generated by the system comprises the question whether the call should be forwarded to a voice mail system. In case of YES the call is forwarded to the voice mail system in voice mail step V. In case of NO the telecommunication connection is set up according to connection step C.

The embodiments of FIGS. 1 and 2 each have the advantage that the output of the system is presented before a telecommunication connection for the call is set up to enable the user to prevent establishing of the call. The questions to the users according to steps S4 and S6, S6' in FIG. 1 and to steps Z8 and Z10 in FIG. 2 can be preset in the system and/or set individually by the user indicated by preset steps P4 and P6, P6' in FIG. 1 and preset steps P8 and P10 in FIG. 2, respectively.

According to the invention each time a user initiates or receives a call the system verifies whether specific journal entries and/or voice mail messages are stored for the respective user and the system presents in case of said specific entries or messages an output to the user.

Figure 3:
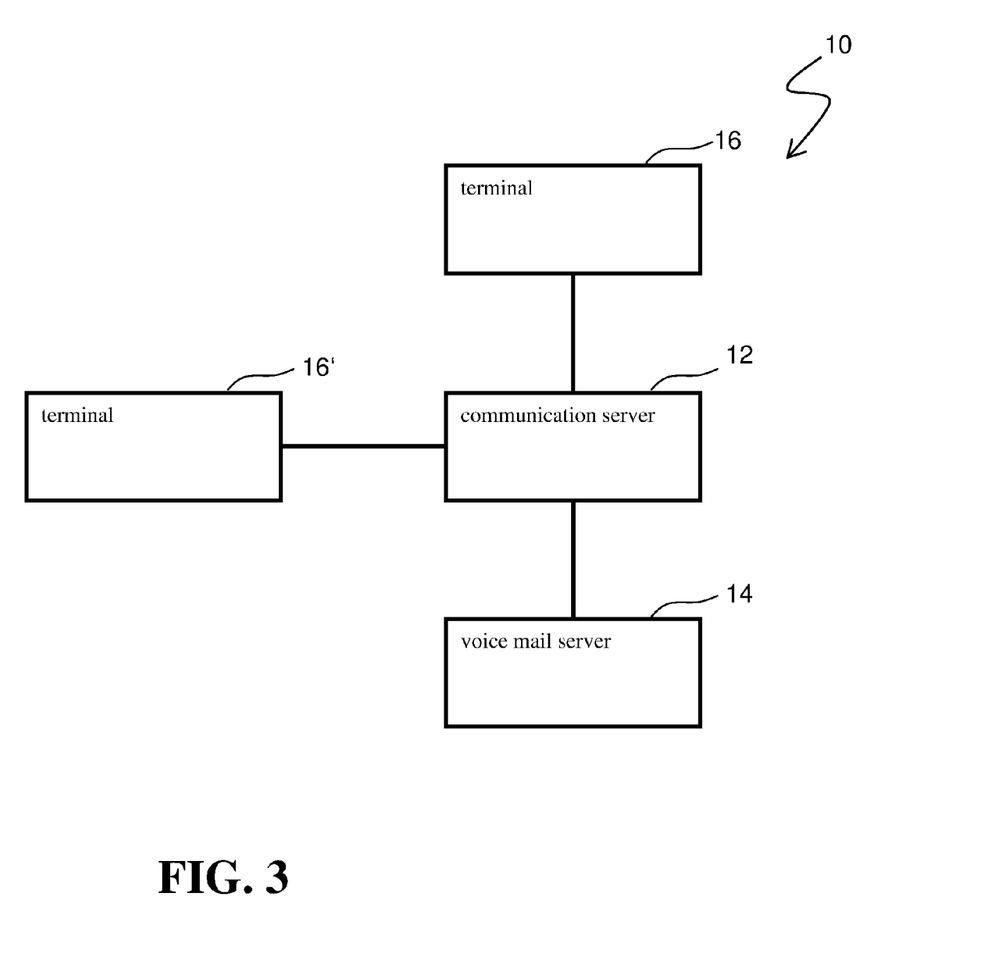
FIG. 3 is a block diagram of a system for telecommunication according to the invention.

FIG. 3 illustrates a system 10 for telecommunication, comprising means for initiating and receiving calls for at least one user of the system, said means being implemented on a communication server 12, and a storage unit for storing individual journal entries and/or voice mail messages for each user, said storage unit being part of a voice mail server 14. The communication server 12 is connected to the voice mail server 14 and to individual terminals 16, 16'.

The system 10 further comprises a control unit for verification of specific journal entries and/or voice mail messages stored in the storage unit, said control unit being part of the communication server 12. The control unit is able to verify each time a user initiates or receives a call by one of the terminals 16, 16' whether specific journal entries and/or voice mail messages are stored for the respective user and to present in case of specific entries or messages an output to the user.

Typically, the terminals 16, 16' each comprise a display, preferably a graphical user interface, for presenting the output to the user. The terminals 16, 16' of the system 10 are usually phones, in particular smartphones or tablets, for the users.

In a first configuration of the system 10 as another embodiment of the invention journal entries and voice mail messages, respectively, as well as all information related to journal entries and voice mail messages, respectively, are stored and available on the voice mail server 14 only.

In a second configuration of the system 10 as yet another embodiment of the invention journal entries and voice mail messages, respectively, are stored on the voice mail server 14 and information related to specific journal entries and voice mail messages, respectively, is available on both voice mail server 14 and communication server 12. For this purpose, voice mail server 14 and communication server 12 have a constant communication connection for information data transfer. The second configuration of the system 10 has the advantage of enhanced performance due to the fact that an additional request from the communication server 12 to the voice mail server 14 on specific journal entries and voice mail messages, respectively, is unnecessary.

Figure 4:
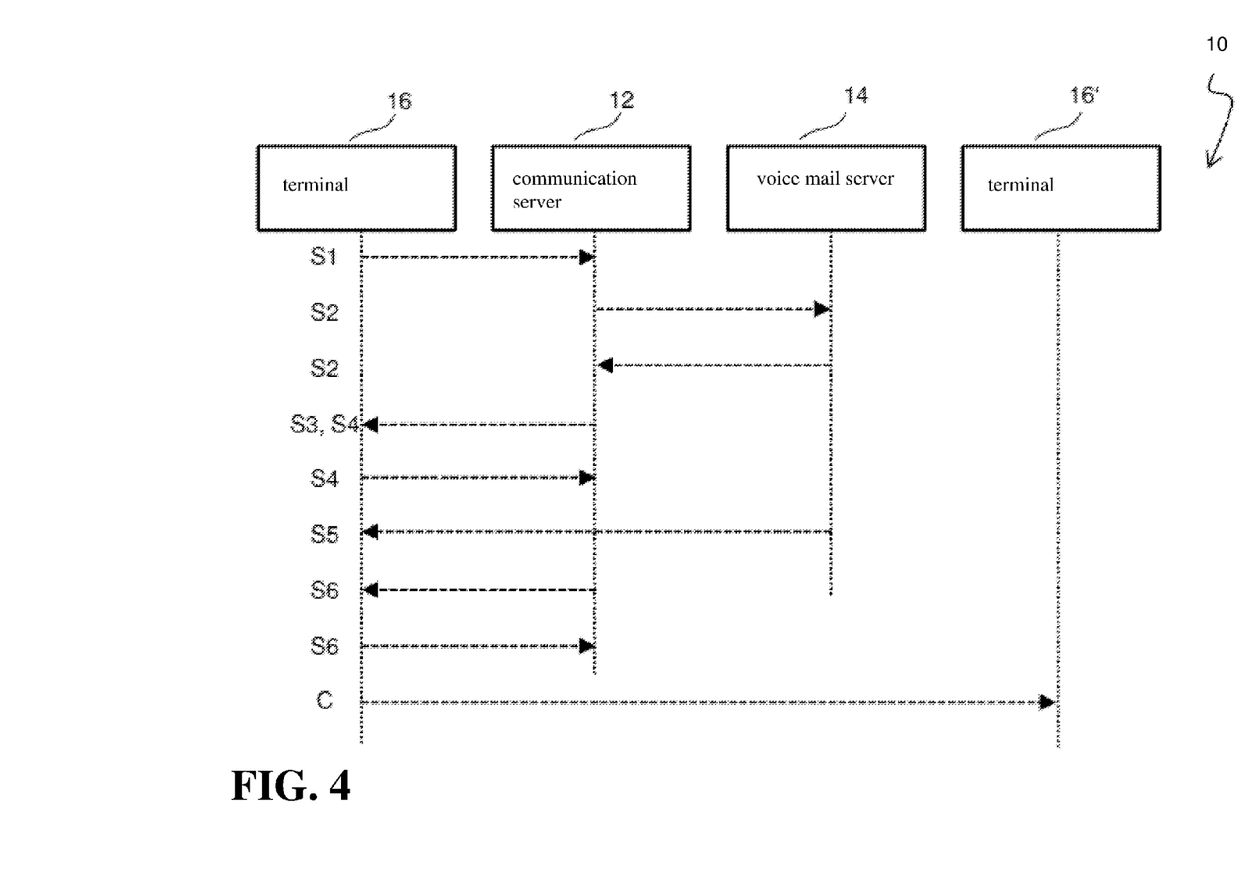
FIG. 4 is a diagram of the signaling of the system for telecommunication according to the invention in case of an outgoing call.

FIG. 4 illustrates signaling of the system 10 during performing the steps S1 to S6 and C of the method of FIG. 1 wherein a user initiates an outgoing call from terminal 16 to another terminal 16'. FIG. 4 relates to the first configuration of the system 10 wherein all information related to journal entries and voice mail messages, respectively, are available on the voice mail server 14 only. In case of the second configuration of the system 10 wherein information related to specific journal entries and voice mail messages, respectively, are available on the communication server 12 the request from the communication server 12 and the respective response from the voice mail server 14 are unnecessary in step S2. Steps S2, S4 and S6 may comprise a request of the requesting unit and an answer of the requested unit, respectively.

Figure 5:
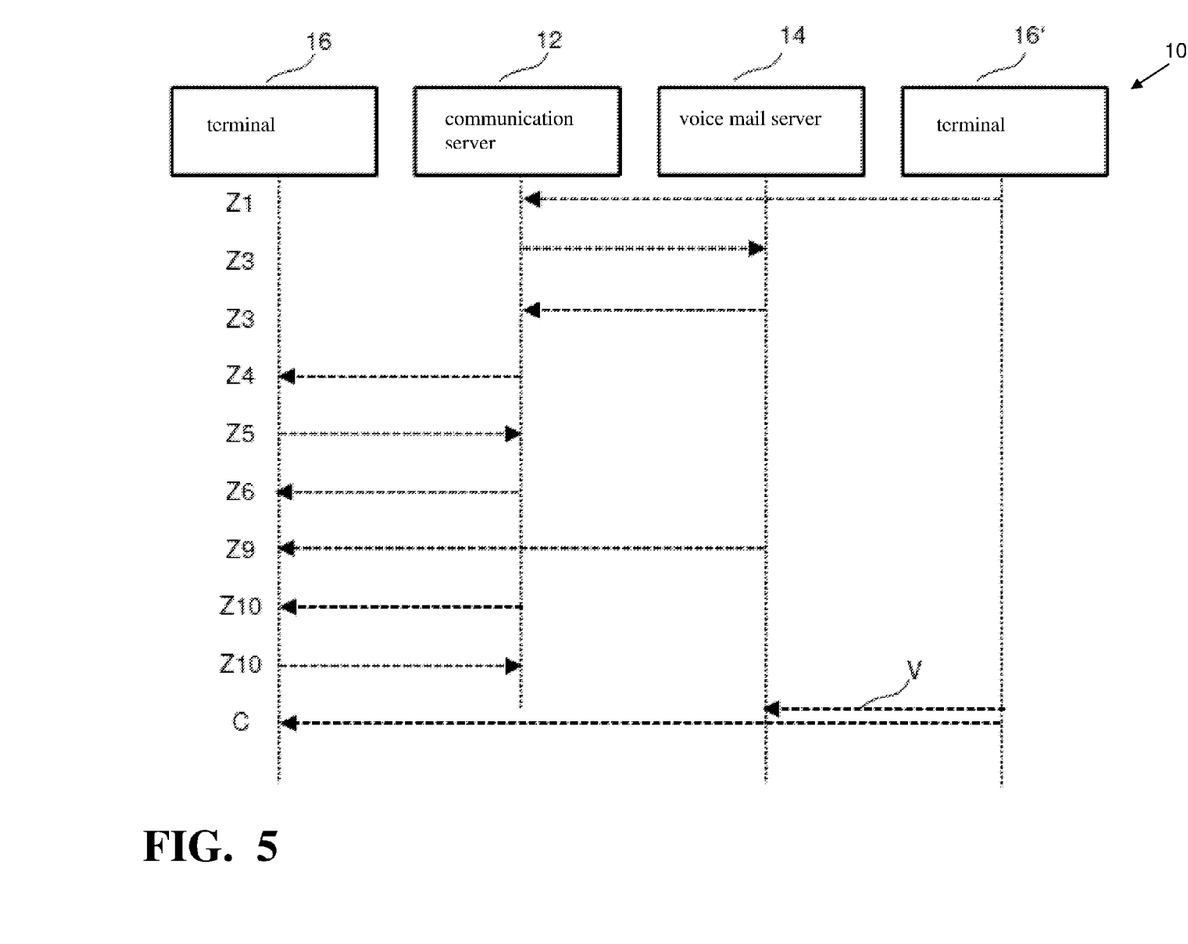
FIG. 5 is a diagram similar to FIG. 4 and signaling of the system for telecommunication according to the invention in case of an incoming call.

FIG. 5 illustrates signaling of the system 10 during performing the steps Z1 to Z10 and C of the method of FIG. 2 wherein a user receives an incoming call from another terminal 16' to terminal 16. FIG. 5 relates to the first configuration of the system 10 wherein all information related to journal entries and voice mail messages, respectively, are available on the voice mail server 14 only. In case of the second configuration of the system 10 wherein information related to specific journal entries and voice mail messages, respectively, are available on the communication server 12 the request from the communication server 12 and the respective response from the voice mail server 14 are unnecessary in step Z3. Steps Z3 and Z10 may comprise a request of the requesting unit and an answer of the requested unit, respectively.

A technical feature or several technical features which has/have been disclosed with respect to a single or several embodiments disclosed herein before, e. g. verifying whether a text terminal is used according to step Z7 in FIG. 2, may be present also in another embodiment, e. g. generating an output comprising the question whether the call should be forwarded to a voice mail system according to step Z10 as combined with step Z7 in FIG. 2, except it is/they are specified not to be present or it is impossible for it/them to be present for technical reasons.

While certain present preferred embodiments of the communication terminal, communication system, and methods of making and using the same have been shown and described above, it is to be distinctly understood that the invention is not limited thereto but may be otherwise variously embodied and practiced within the scope of the following claims.

What is claimed is:

1. A method for telecommunication, comprising:
storing individual journal entries and/or voice mail messages for a first user,
prior to forming a connection for a call between a communication device associated with the first user and a communication device associated with a second user and after receiving an address to initiate formation of the connection for the call, verifying, whether one or more journal entries and/or voice mail messages are stored for the first user; and
in response to finding one or more journal entries and or voice mail messages stored for the first user from the verifying, presenting an output to the first user to inform the first user that said one or more journal entries and/or voice mail messages have been found prior to the forming of the connection for the call between the communication device associated with the first user and the communication device associated with the second user.

2. The method according to claim 1, further comprising:
querying whether the connection for the call between the communication device associated with the first user and the communication device associated with the second user is to be setup after the one or more journal entries and or voice mail messages stored for the first user are found to enable the first user to prevent establishing of the call to enable the first user to cancel a call set up being performed to establish the connection.

3. The method according to claim 1, wherein the output comprises at least one of a list of said journal entries or messages and a content of at least one of each of said journal entries or messages.

4. The method according to claim 1, wherein the journal entries comprise information on at least one of incoming calls, outgoing calls, accepted calls, refused calls and missed calls.

5. The method according to claim 1, wherein the verifying is performed by a communication system to take into account at least one of journal entries that are new to the first user and voice mail messages that are new to the first user.

6. The method according to claim 1, wherein verifying is performed by a communication system and takes into account at least one of journal entries received within a predefined period and voice mail messages received within a predefined period.

7. The method according to claim 1, wherein the verifying is performed by a communication system to take into account at least one of journal entries related to the second user and voice mail messages related to the second user.

8. The method according to claim 1, wherein the verifying takes into account at least one of journal entries related to a predefined group of users and communication partners and voice mail messages related to a predefined group of users and communication partners.

9. The method according to claim 1, wherein the output is generated by a communication system, the output comprises at least one of an acoustic signal and a visual signal sent to the communication device associated with the first user.

10. The method according to claim 1, wherein said voice mail messages are speech-to-text converted and presented to the first user on a display of the communication device associated with the first user.

11. The method according to claim 1, further comprising sending a query to the communication device of the first user asking whether the first user intends to have the connection for the call established after the output is presented.

12. A system for telecommunication, comprising:
a first terminal configured to initiate and receive calls for at least a first user;
a storage unit configured to store at least one of journal entries and voice mail messages for the first user,
a control unit configured to verify at least one of journal entries stored in the storage unit and voice mail messages stored in the storage unit prior to a connection for a call between the first terminal and a second terminal associated with a second user is formed and after an address to initiate formation of the call is received; and
the control unit configured to initiate presenting of output to be provided by the first terminal to inform the first user that said one or more journal entries and/or voice mail messages have been found prior to the forming of the connection for the call in response to finding one or more journal entries and/or voice mail messages stored in the storage unit that relate to the second user.

13. The system according to claim 12, wherein the system comprises a display connected to the first terminal for presenting the output to the first user.

14. The system according to claim 13, wherein the display is a graphical user interface.

15. The system according to claim 12, wherein the first terminal is a smartphone or a tablet.

16. The system according to claim 12, wherein the connection is a telecommunication connection for a speech communication.

17. The system according to claim 12, wherein the output comprises a list of said journal entries or voice mail messages and a content of said journal entries and/or voice mail messages.

18. The system according to claim 12, wherein the journal entries comprise information on at least one of incoming calls, outgoing calls, accepted calls, refused calls and missed calls.

19. The system according to claim 12, wherein the control unit is configured to take into account during verification at least one of journal entries that are new to the first user and voice mail messages that are new to the first user.

20. The system according to claim 12, wherein the control unit is configured to take into account during verification at least one of journal entries received by the storage unit within a predefined period and voice mail messages received by the storage unit within a predefined period.

21. The system according to claim 12, wherein the control unit is configured such that any voice mail messages left by the second user and/or any journal entries stored in the storage unit that are new to the first user are found and are communicatable to the first user via the output prior to a connection for the call between the first terminal and the second terminal associated with the second user is formed.

22. The system according to claim 12, wherein the control unit is configured to take into account during verification at least one of journal entries related to a predefined group of users and communication partners and voice mail messages related to a predefined group of users and communication partners.

23. The system according to claim 12, wherein the output comprises at least one of an acoustic signal and a visual signal.

24. The system of claim 23 wherein the output is an announcement to be emitted by the first terminal to the first user.

25. The system according to claim 12, wherein the system is configured to speech-to-text convert voice mail messages stored in the storage unit and the output of the voice mail messages is text output communicated via a display of the first terminal.

26. The system according to claim 12, wherein the control unit is configured to query the first user to ask whether the first user intends to establish the connection for the call after the output is presented to the first user and before the connection is established.

27. A non-transitory computer readable medium having a program defining a method that is executable by a communication apparatus when the program is run by that communication apparatus, the method comprising:
   prior to forming a connection for a call between a communication device associated with a first user and a communication device associated with a second user and after receiving an address to initiate formation of the connection for the call, verifying, whether one or more specific journal entries and/or voice mail messages for the first user are stored in a storage device; and
   in response to finding one or more specific journal entries and/or voice mail messages stored in the storage device for the first user from the verifying, presenting an output to the first user to inform the first user that said one or more specific journal entries and/or voice mail messages have been found prior to the forming of the connection for the call between the communication device associated with the first user and the communication device associated with the second user.

28. The non-transitory computer readable medium according to claim 27, wherein the call is a speech based telecommunication connection.

29. The non-transitory computer readable medium according to claim 27, wherein the method further comprises:
   sending a query to the communication device associated with the first user, the query configured to ask whether the first user further intends to have the connection for the call established after the output is presented to the first user.

\* \* \* \* \*